United States Patent
Li et al.

(10) Patent No.: US 10,931,567 B2
(45) Date of Patent: *Feb. 23, 2021

(54) SYSTEM AND METHOD FOR RESTORATION IN A MULTIMEDIA IP NETWORK

(71) Applicant: AT&T Intellectual Property I, L.P., Atlanta, GA (US)

(72) Inventors: Guangzhi Li, Kearny, NJ (US); Dongmei Wang, Kearny, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/978,824

(22) Filed: May 14, 2018

(65) Prior Publication Data

US 2018/0270147 A1     Sep. 20, 2018

Related U.S. Application Data

(63) Continuation of application No. 15/356,825, filed on Nov. 21, 2016, now Pat. No. 9,979,634, which is a continuation of application No. 14/196,328, filed on Mar. 4, 2014, now Pat. No. 9,503,315, which is a continuation of application No. 12/910,274, filed on (Continued)

(51) Int. Cl.
| | |
|---|---|
| *H04L 12/703* | (2013.01) |
| *H04L 12/42* | (2006.01) |
| *H04L 12/751* | (2013.01) |
| *H04L 12/721* | (2013.01) |
| *H04L 12/735* | (2013.01) |
| *H04L 12/761* | (2013.01) |
| *H04L 12/707* | (2013.01) |

(Continued)

(52) U.S. Cl.
CPC .............. *H04L 45/28* (2013.01); *H04L 12/18* (2013.01); *H04L 12/42* (2013.01); *H04L 41/0654* (2013.01); *H04L 45/02* (2013.01); *H04L 45/12* (2013.01); *H04L 45/128* (2013.01); *H04L 45/16* (2013.01); *H04L 45/22* (2013.01); *H04L 45/1283* (2013.01); *H04L 2212/00* (2013.01)

(58) Field of Classification Search
CPC ... H04L 41/0654; H04L 45/128; H04L 45/12; H04L 45/16; H04L 45/22; H04L 45/28; H04L 45/1283; H04L 12/18; H04L 12/42
See application file for complete search history.

(56) References Cited

U.S. PATENT DOCUMENTS

| | | | | |
|---|---|---|---|---|
| 6,507,562 B1 * | 1/2003 | Kadansky | ........... | H04L 12/1877 370/216 |
| 6,584,075 B1 * | 6/2003 | Gupta | ................... | H04L 12/185 370/256 |

(Continued)

*Primary Examiner* — Robert C Scheibel
(74) *Attorney, Agent, or Firm* — Guntin & Gust, PLC; Jay Anderson

(57) ABSTRACT

Disclosed herein are systems, methods, and computer readable media for modifying IP backbone link weights such that multicast traffic and unicast traffic will not travel on a same path between nodes. The method comprises assigning link weights to nodes within an IP backbone such that multicast forwarding paths and unicast forwarding paths are failure disjoint, and delivering undelivered multicast packets using IP unicast encapsulation to the loopback address of next hop router on a multicast tree upon link/interface failure.

14 Claims, 5 Drawing Sheets

Related U.S. Application Data

Oct. 22, 2010, now Pat. No. 8,665,698, which is a continuation of application No. 12/019,797, filed on Jan. 25, 2008, now Pat. No. 7,830,785.

(51) Int. Cl.
*H04L 12/18* (2006.01)
*H04L 12/24* (2006.01)

(56) References Cited

U.S. PATENT DOCUMENTS

| | | | |
|---|---|---|---|
| 6,778,531 B1* | 8/2004 | Kodialam | H04L 12/18 370/256 |
| 7,366,109 B2* | 4/2008 | Ashwood-Smith | H04L 45/02 370/254 |
| 7,573,875 B2* | 8/2009 | Cankaya | H04L 12/1877 370/390 |
| 7,656,792 B2 | 2/2010 | Zhang et al. | |
| 7,830,785 B2 | 11/2010 | Li et al. | |
| 2002/0141345 A1* | 10/2002 | Szviatovszki | H04L 45/00 370/238 |
| 2004/0078624 A1* | 4/2004 | Maxemchuk | H04L 12/1868 714/4.2 |
| 2006/0002291 A1* | 1/2006 | Alicherry | H04L 45/00 370/225 |
| 2006/0159009 A1* | 7/2006 | Kim | H04L 12/18 370/216 |
| 2007/0019646 A1* | 1/2007 | Bryant | H04L 12/1868 370/390 |
| 2007/0058646 A1* | 3/2007 | Hermoni | H04L 12/18 370/401 |
| 2007/0268820 A1* | 11/2007 | McGee | H04B 3/46 370/217 |
| 2008/0107017 A1* | 5/2008 | Yuan | H04L 41/0663 370/228 |
| 2008/0107018 A1* | 5/2008 | Zhang | H04L 12/1877 370/228 |
| 2008/0201752 A1* | 8/2008 | Liu | H04L 1/1854 725/114 |

* cited by examiner

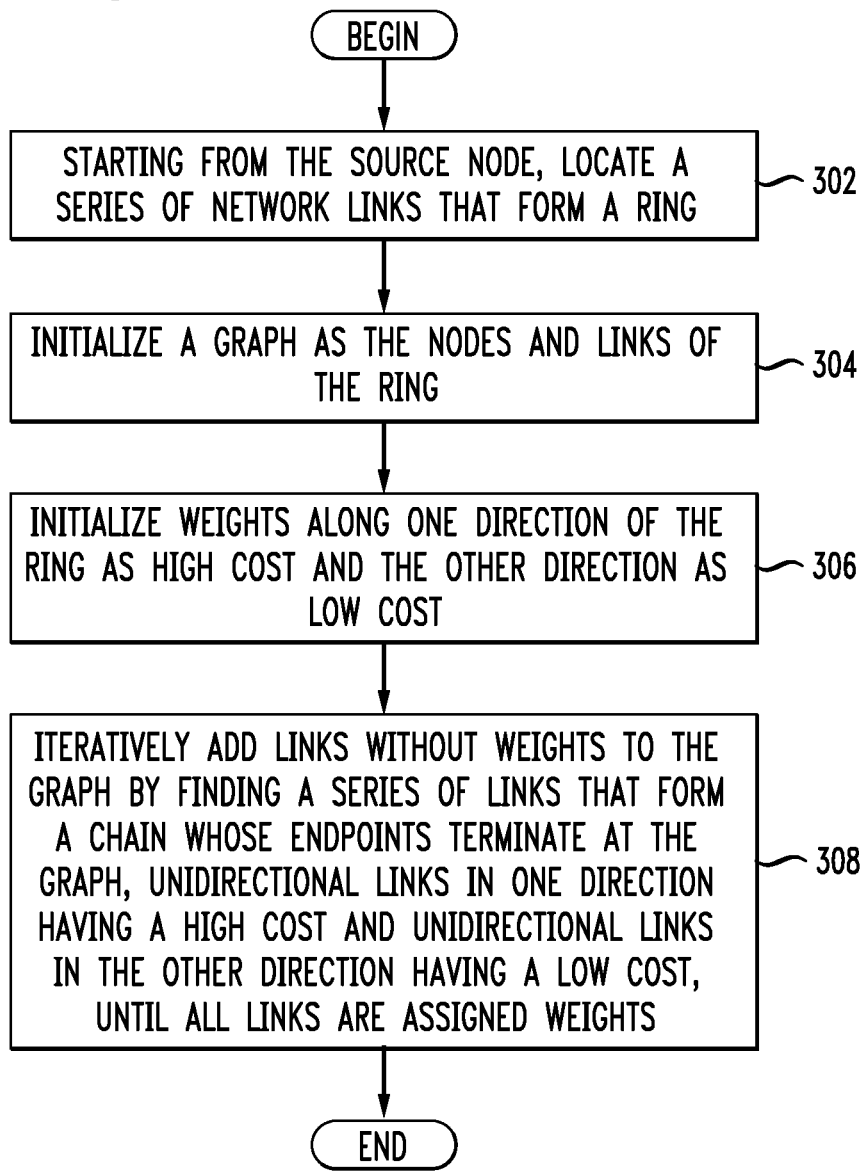

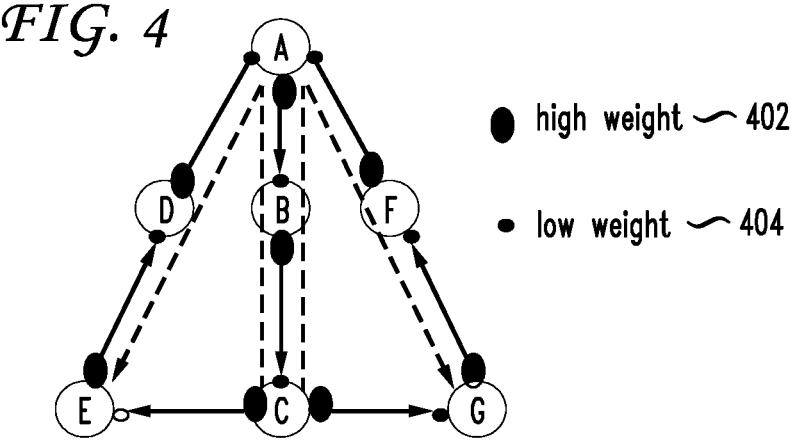

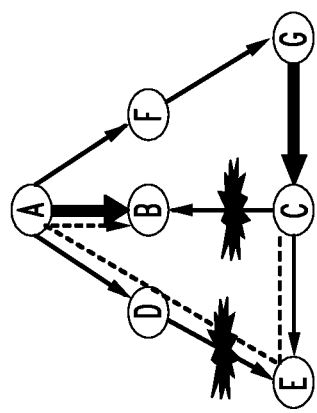
FIG. 5a.3
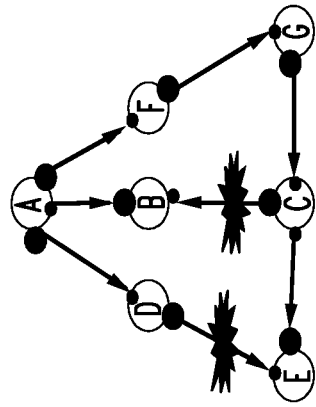
FIG. 5b.3
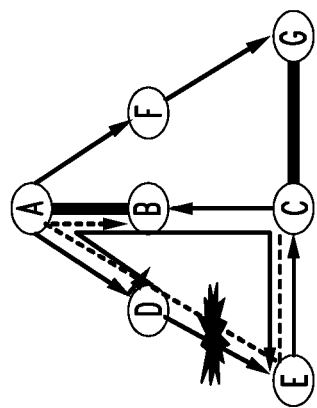
FIG. 5a.2
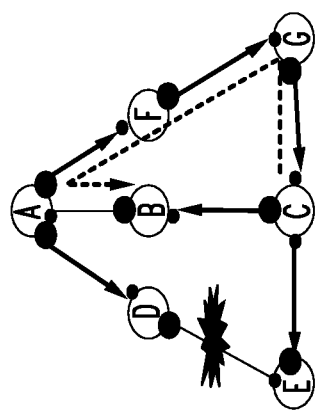
FIG. 5b.2
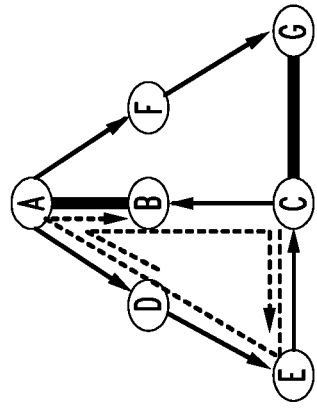
FIG. 5a.1
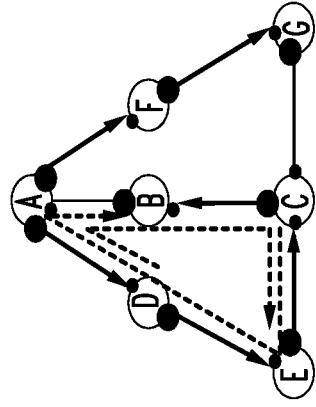
FIG. 5b.1

SYSTEM AND METHOD FOR RESTORATION IN A MULTIMEDIA IP NETWORK

PRIORITY

The present application is a continuation of U.S. patent application Ser. No. 15/356,825, filed Nov. 21, 2016, now U.S. Pat. No. 9,979,634, issued on May 22, 2018, which is a continuation of U.S. patent application Ser. No. 14/196,328, filed Mar. 4, 2014, now U.S. Pat. No. 9,503,315, issued on Nov. 22, 2016, which is a continuation of U.S. patent application Ser. No. 12/910,274, filed Oct. 22, 2010, now U.S. Pat. No. 8,665,698, issued on Mar. 4, 2014, which is a continuation of U.S. patent application Ser. No. 12/019,797, filed Jan. 25, 2008, now U.S. Pat. No. 7,830,785, issued on Nov. 9, 2010, the content of which are included herewith in their entirety.

BACKGROUND OF THE INVENTION

1. Field of the Invention

The present invention relates generally to streaming traffic over a network, and relates more specifically to restoring multicast traffic upon failure through an IP network.

2. Introduction

Distribution of real-time multimedia over an IP backbone has been gaining momentum with content and service providers. However, unlike traditional cable-based broadcast infrastructures that provide "broadcast" analog-based video (such as TV), using an IP backbone for real-time broadcast video distribution imposes stringent requirements for protection and restoration upon a failure. Broadcast TV distribution over an IP network usually adopts multicast forwarding, and is characterized by high bandwidth requirement and tight latency and loss constraints even under failure conditions. The network should be able to restore service rapidly and achieve very high availability.

The current default architecture for the IP backbone consists of routers connected by links with the topological state maintained by an interior gateway protocol (IGP) such as Open Shortest Path First (OSPF). Each link is assigned a suitable weight and each router is configured with multicast capability. A multicast tree is generated such that each multimedia destination (MD) receives only one copy of the IP packet from the server at the multimedia source (MS, or Head End). The MD consists of backbone routers and servers that receive multimedia programs and serve customers in a specific serving area. For router protection, assume that each MD has two backbone routers that connect to each other and connect to multimedia servers. The multimedia server receives all programs from the multimedia source. The backbone routers are connected via bi-directional router links to form a multimedia IP-layer backbone. Then the whole multimedia network can be divided into one backbone and multiple locales.

Some network restoration alternatives include IGP re-convergence only, Link-layer fast reroute, and fast reroute plus hitless multicast tree switching, but each has its drawbacks.

IGP re-convergence relies completely on IGP routing and Protocol-Independent Multicast (PIM) forwarding. Whenever a network failure occurs, link state advertisements (LSA) are broadcast. The IGP re-computes its paths and next-hop routing tables. Upon completion, PIM re-computes its multicast tree. To avoid route flapping and to improve network stability, IGP routing protocols are often designed with various timers calculated to limit the frequency of the shortest path calculation and dissemination of link state advertisements (LSAs). In general, the IGP protocol attempts to propagate information about failures quickly, but waits to propagate less disruptive configuration changes (when links or routers come up). Although those timers may be aggressively to achieve sub-second converging times, service providers tend to set those timers conservatively for stable network operation in practice. Actual IGP converging times may vary, but transient path outages of 10 seconds or more may not be uncommon. The frequency of outages even from single link or router failures in a long distance IP backbone that solely depends on IGP re-convergence and PIM multicast tree reconfiguration is likely to yield unacceptable quality of service (QoS) for broadcast video applications.

Link-layer fast reroute (FRR) overcomes the QoS impact caused by single IP-layer link failures. For each link in the IP-layer topology, a bundle link is pre-computed that consists of two paths: the primary path with high priority (usually the direct one-hop path between the routers) and a diverse backup path with low priority. The backup path is usually diverse at Layer 1 and at intermediate routers. From the standpoint of the Layer 3 IGP, the bundle link is down if and only if both the primary and backup paths fail. In normal operation, the traffic is forwarded via the primary path. Upon primary path failure, all traffic routed over the primary path is rerouted onto the backup path, provided the backup path is operational during the failure. Traffic remains on the backup path until the failure is repaired and the primary path comes back up.

Some vendors have demonstrated a fast reroute mechanism to switch to the backup path within 50 milliseconds. Since the primary path and its backup path are disjoint at the IP and physical layers, no bundle link will fail from any single fiber or WDM lower layer link failure if hold-down timers are specified appropriately. Thus, for any single link failure, IGP will detect no change to the IP topology and, therefore, no routing changes will occur, nor will there be any changes to the multicast tree. The failure impact will thus be reduced from the ten or more seconds possible under IGP re-convergence time to 50 milliseconds for any single link failure.

One potential problem is traffic overlap during restoration. An advantage of IP multicast is the low cost for forwarding, i.e., often much lower link capacity is required when compared with unicast forwarding. Furthermore, given the large number of streams or channels carried in today's video broadcast networks, significant multiplexing gain can be achieved. Thus, network capacity can be engineered economically and with high link utilization during the normal (no-failure) state. However, during network failures, the use of link back-up paths in the multicast network can potentially cause overlap of streams on the same link, which may lead to congestion. Here traffic overlap means that the same multicast packets travel the same link along the same direction more than once. Even slight performance degradation in video networks can cause loss of service to particular destinations. To resolve this issue, IGP link weights may be tuned such that at least one backup path exists for each link on the IP multicast tree and backup path traffic does not overlap with the multicast tree upon any single link failure.

Another problem with FRR is that a backup path for a given link is typically pre-calculated independent of the backup paths of other links. Since the backup paths are pre-calculated, there is no real-time, dynamic accommodation for different combinations of multiple failures and, consequently, traffic overlap may still occur during such failure states. In long distance networks, multiple physical layer failures are not extremely rare events and have a non-trivial effect on network availability and on the resulting video QoS. From the standpoint of combinatorial optimization, pre-defining backup paths that are failure-state-independent, covering a significant set of multiple failure states, and preventing traffic overlapping is usually infeasible. Since repair times may be on the order of hours, the impact on network availability is non-negligible considering the more stringent QoS requirements from broadcast video.

The third alternative, fast reroute plus hitless multicast tree switching, overcomes the congestion issues in link-layer fast reroute. The basic idea is to apply the fast reroute mechanism but effectively limit its use only to the period during IGP routing and PIM protocol re-convergence. After the primary path of a bundle link fails, the traffic is switched over to the backup path. However, in contrast to link-layer fast reroute, either a link-down LSA is generated or the router costs-out the bundle link (setting the weight to a very high value) whenever an IP link fails such that the new IGP topology and the resulting multicast tree do not use the backup path. Once IGP routing converges, a new PIM tree is rebuilt automatically. This achieves the benefit of rapid restoration from single link failures, yet allows the multicast tree to dynamically adapt to multiple failures. Only during this small, transient period is the network exposed to potential path overlap on the same link along the same direction.

A key component of fast reroute plus hitless multicast tree switching is make-before-break change of the multicast tree switching, i.e., the requirement to switch traffic from the old multicast tree to the new multicast tree with minimal loss of traffic. This technique minimizes the potential traffic "hit" that would be incurred after every single failure when the new tree is generated. The sequence of operations upon a link failure for fast reroute plus hitless multicast tree switching is as follows:

(a) When a primary path failure occurs, invoke the FRR mechanism to reroute the traffic to the backup path, provided the backup is operational.

(b) Send out an LSA with "link-down" or one that advertises a high weight (cost-out) for the associated IP-layer link. During the time of IGP re-convergence, traffic is forwarded along the backup path.

(c) After IGP re-convergence is completed, PIM rebuilds its multicast tree.

(d) Once the multicast tree is rebuilt, implement the make-before-break method, wherein joining of nodes to the tree is sequenced so that downstream nodes are not joined to the new tree until traffic flows to their parent nodes.

After the failures are repaired, LSAs are advertised to either announce the links back up or their weights are reset to their original values, depending on the option chosen in step 4. This normalization phase is another motivation for the "hitless" method, to minimize downtime after a failure is repaired.

Fast reroute plus hitless multicast tree switching increases service availability significantly. However, it still has some obvious drawbacks. It increases network operation complexity significantly: the network operator would have to manually configure the tunnels or run an additional protocol (a signaling protocol) to create the tunnels; the method still applies static backup path selection in that a dual failure may take out both a primary link and its backup path; the IGP and PIM protocols have to work coordinately; the software in routers has to implement extra mechanisms, such as "make-before-break". Accordingly, what is needed in the art is an efficient and simple way to avoid traffic overlap and create dynamic backup path when streaming media over IP networks even in the event of one or more network failures.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer-readable media for modifying IP backbone link weights such that multicast traffic and unicast traffic will not travel on a same path between nodes by assigning link weights to nodes within an IP backbone such that multicast forwarding paths and unicast forwarding paths are failure disjoint, and delivering undelivered multicast packets using IP unicast encapsulation to a next hop router on a multicast tree upon link/router interface failure.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 3 illustrates the link weight setting algorithm;
FIG. 4 illustrates link weights for IP encapsulation;
FIGS. 5a1, 5a2, and 5a3 illustrate the impact of a dual link failure scenario with a static backup path approach;
FIGS. 5b1, 5b2, and 5b3 illustrate the impact of a dual link failure scenario with a dynamic unicast path approach.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
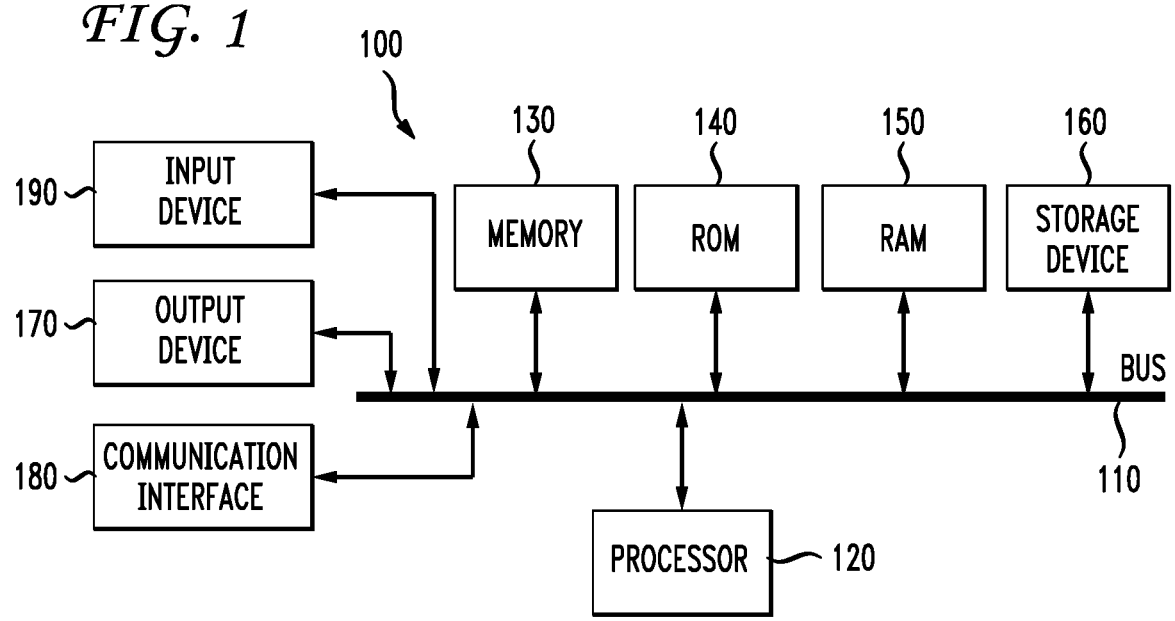
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
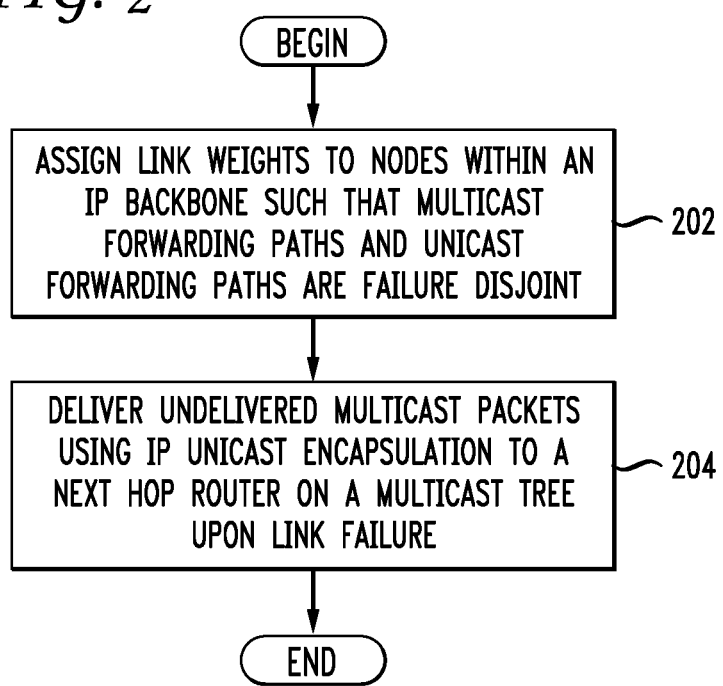
FIG. 2 illustrates a method embodiment of the invention.

FIG. 2 illustrates a method embodiment of the invention. First, the method assigns link weights to nodes within an IP backbone such that multicast forwarding paths and unicast forwarding paths are failure disjoint (202). In this context, multicast packets may be assigned a higher forwarding priority and encapsulated unicast packets may be assigned a lower forwarding priority to avoid unwanted congestion. The IP backbone may be an undirected network graph that is at least 2-connected, wherein at least one source node provides the multicast traffic. Second, the method delivers undelivered multicast packets using IP unicast encapsulation to a next hop router on a multicast tree upon network failure (204).

The traffic provided may be a television, audio, or radio signal, streaming program instructions, etc. The traffic is not necessarily strictly limited to one-way communications, and could be applied to situations like conference calls (multicast traffic in both directions), issuing instructions to multiple nodes in a computing cluster (multicast traffic in one direction and unicast traffic in the other), etc.

FIG. 3 illustrates the link weight setting algorithm. First, starting from the source node, locate a series of network links that form a ring (302). Second, initialize a graph as the nodes and links of the ring (304). Third, initialize weights along one direction of the ring as high cost and the other direction as low cost (306). Fourth, iteratively add links without weights to the graph by finding a series of links that form a chain whose endpoints terminate at the graph, unidirectional links in one direction having a high cost and unidirectional links in the other direction having a low cost, until all links are assigned weights (308).

The pseudo-code of our algorithm is presented as algorithm LinkWeight, where the notations are defined as follows: for any graph G', E(G') means the set of all links in G', and |E(G')| is the number of the links; for any link (u,v) in G', u(v) means the interface on node u connecting to node v. G' and G" indicate two graphs. G'+G" means union of the two graphs. G'\G" means removing the sub-graph of G" from graph G'.

---

ALGORITHM LinkWeight
Input: Network H, source s
Output: Graph G with link weight setting
Let G=Ø; N= |E(H)|;
Find nodes s, $u_1$, ..., $v_n$, s that form a ring R on H;
    Assign interfaces s(u), ..., v(s) with weight 1;
    Assign interfaces s(v), ..., u(s) with weight N;
    G=G+R; H=H\R;
Loop: Find nodes x, $u_1$, ..., $u_k$, y that form a chain C on H,
where x and y on G;
    Assign interfaces x($u_1$), ..., $u_k$(y) with weight 1;
    Assign interfaces y($u_k$), ..., $u_1$(x) with weight N;
    G=G+C; H=H\C;
If H != Ø, go to Loop;
Return G;

---

A single multicast source is assumed, but even if multiple multicast sources exist at different locations, the network link weights assigned by LinkWeight algorithm will still separate the multicast trees and unicast paths.

The IP encapsulation restoration method could be implemented using two functions: upon detecting a failure, the multicast node encapsulates undelivered multicast packets in unicast packets and sends them to the next hop node on the multicast tree via unicast forwarding, and upon receiving an encapsulated unicast packet, the multicast node de-capsulates the unicast packets and forwards the enclosed multicast packet to the downstream nodes on the multicast tree. With the assumption of multicast routing protocol of PIM-SM, i.e., protocol independent multicast with sparse mode, these two functions can be achieved with existing PIM-SM specification plus little change. In PIM-SM, each group has a unicast message called a register message and there is a specific Rendezvous Point (RP). The register message is a unicast message and is used by the designated router (DR) for a multicast source to send the data packets to the RP via unicast path. To support IP encapsulation restoration, a register message may be allowed to flow between multicast routers even if they are not DR for a data source or a RP for a group. Upon failure, a multicast router encapsulates undelivered multicast packets in Register messages and sends them to the next hop node on the multicast tree. Upon receiving the encapsulated packet, the multicast router de-capsulates the message, and forwards to the downstream nodes on the multicast tree just like a RP. A node should drop the encapsulated message if it is receiving the normal multicast packets for the same group.

To implement the IP encapsulation restoration method, vendors only need to modify the multicast module to detect the failure and use Register message to deliver the undelivered multicast packets, and also modify the module to handle the encapsulated message appropriately once a multicast router receives it.

For the multicast routing table, the router needs not only the multicast tree outgoing interfaces, but also the next router loop back addresses of each outgoing interfaces for undelivered multicast packets encapsulation.

FIG. 4 illustrates link weights for IP encapsulation. In FIG. 4, a large dot 402 means high weight and a small dot 404 means low weight for the links pointing outwards from the interface. It is easy to verify that the solid arrows form the multicast tree. Each directional link on the multicast tree is failure disjoint from its unicast shortest path between the two end nodes. For example, for link C-E, the shortest unicast path from C to E is C-B-A-D-E. Since link C-E and the unicast path C-B-A-D-E are failure disjoint, upon link C-E failure, the unicast shortest path between C and E is not affected by the failure, so the router C will encapsulate the multicast packets with IP address destined to router E and the encapsulated IP unicast packets will travel along the path (C-B-A-D-E) to reach downstream node E during the network convergence. Similarly if link C-G fails, router C will encapsulate the undelivered multicast packets with IP address destined to router G and the encapsulated IP unicast packets will travel along path C-B-A-F-G. Under any single link failure, the network continues to function perfectly. The network can also survive multiple failures or continue to provide degraded services for a short period (convergence time only) under multiple failures, as illustrated in FIG. 5.

FIG. 5a illustrates the impact of a dual link failure scenario with a static backup path approach. In FIG. 5a, thick lines are links with high link weight, and thin lines are the links with low link weights. Here only link A-B and link C-G have high weights while all other links have low weights. Under normal operation, the solid arrows in FIG. 5a1 show the multicast tree. The dotted arrows in FIG. 5a1 are static backup paths for unidirectional link D-E and unidirectional link C-B respectively. Upon link D-E failure, multicast packets are rerouted to node E via static backup path D-A-B-C-E, as illustrated in FIG. 5a2. Note that there is no network re-convergence since bundle link E-D is still operational. If link C-B fails before link D-E is fixed, then both the primary link and backup path of bundle link E-D fail, which would trigger network re-convergence. But the service at node D, E, C, and B would be interrupted until the network is converged and a new tree is rebuilt as shown in FIG. 5a3. In this case, the service interruption could last more than 10 seconds.

FIG. 5b illustrates the impact of a dual link failure scenario with a dynamic unicast path restoration approach. Link weights are associated with interfaces. The big dots in FIG. 5b indicate high weights for the links going outwards at those interfaces, and the small dots indicate low weights. FIG. 5b1 illustrates the network under normal operation, the solid arrows indicating the multicast tree and the dotted arrows indicating the unicast path from D to E and B to C. Upon link D-E failure, the network would re-converge. During the converging period, the node D would encapsulate the undelivered multicast packets with IP destination address of node E and forward them to E following unicast path D-A-B-C-E until a new tree is built. After re-convergence, the unicast path is updated as well. The dotted arrow in FIG. 5b2 is the unicast path from C to B, which is different from the unicast path from C to B in FIG. 5b1. If link B-C fails before link D-E is fixed, node C would encapsulate the undelivered multicast packets with destination address of node B and forward to B via the unicast path in FIG. 5b2 until the new tree is built as shown in FIG. 5b3. During this process, no node experiences service interruption or degradation, demonstrating how dynamic IP unicast encapsulation restoration has multiple failure survivability.

However, under multiple failures, some congestion may happen even with a dynamic unicast approach. For example, if router B fails in FIG. 5b1, the new multicast tree would be A-D-E-C and A-F-G. If link F-G fails while B is being repaired, router F will encapsulate the undelivered multicast packets destined to router F, and the encapsulated packets will travel along path F-A-D-E-C-G, which would overlap with multicast tree branch A-D-E-C and cause potential congestion. To minimize the impact of such unwanted congestion, multicast packets may be assigned higher forwarding priority and encapsulated unicast packets may be assigned lower forwarding priority. In this way, the congestion would only impact the children of the failed link on the multicast tree. In this case, only node G would experience service degradation during network convergence period. However, with static backup path approach, node G would have no service at all during protocol convergence interval.

Figure 6:
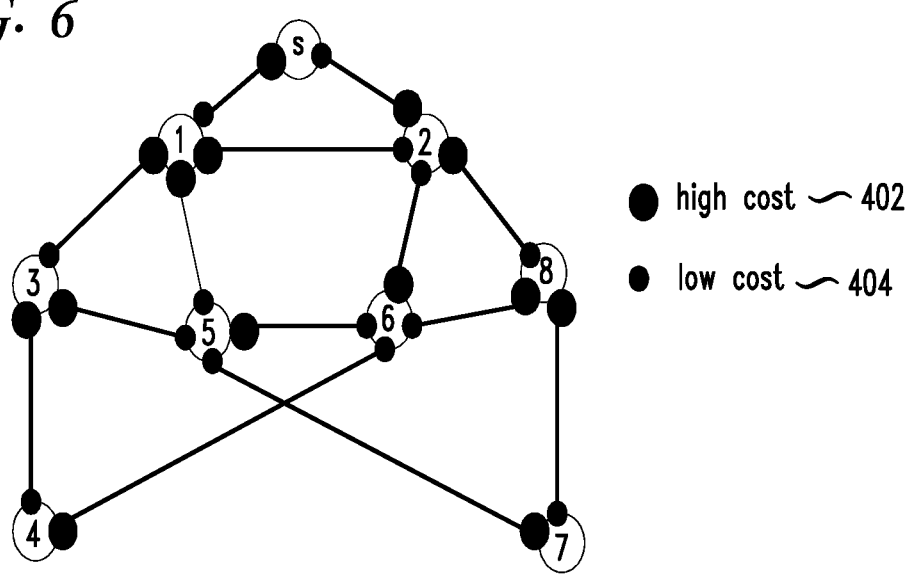
FIG. 6 illustrates a sample undirected network graph with assigned weights.

FIG. 6 illustrates a sample undirected network graph with assigned weights. Specifically, FIG. 6 shows a network with 8 nodes illustrated as circles and 14 undirected links illustrated as lines connecting the nodes. To set the weights, start from S and find a set of links that form a ring, such as S-1-5-6-2-S. Then set the weight of unidirectional links along direction S-1-5-6-2-S to high cost and weights of the unidirectional links along the other direction S-2-6-5-1-S to low cost. The links with assigned weights form graph (ring) G. Next find a set of links that form a path whose endpoints intersect G, e.g. 1-3-5. Set the weight of unidirectional links along direction 1-3-5 to high cost, weight of unidirectional links along the other direction 5-3-1 to low cost, and the add these links to G. Next find another chain whose endpoints intersect G. For example, find 3-4-6, and set unidirectional links along direction 3-4-6 to high cost and unidirectional links along the other direction 6-4-3 to low cost and then add these links to G. Continuing the same procedure, set the weight of unidirectional links along direction 2-8-6 to high cost and 6-8-2 to low cost. Then set unidirectional links along direction 5-7-8 to high cost and unidirectional links along direction 8-7-5 to low cost. Only link 1-2 are left with no weight. According to the algorithm, set unidirectional link 1-2 to high cost and unidirectional link 2-1 to low cost.

Figure 7:
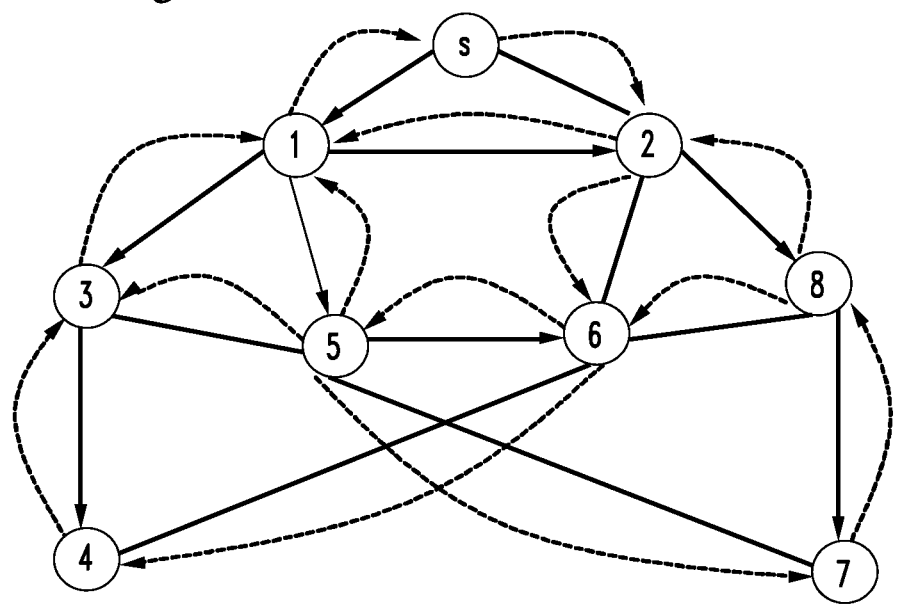
FIG. 7 illustrates a graph for a unicast routing path.

FIG. 7 illustrates a graph for a unicast routing path based on the network shown and described in FIG. 6. With the assigned weights, the multicast tree and the unicast forwarding paths for each unidirectional link on the multicast tree can be generated. They are shown in FIG. 7 where the network is assumed to run PIM-SSM for multicast forwarding and OSPF for unicast routing. The solid arrows form the multicast tree and the dotted arrows form the unicast forwarding paths for each unidirectional link on the multicast tree.

For example, in FIG. 7, we have the following unicast routing paths for each of the multicast links:
S-1: S-2-1
1-2: 1-S-2
1-3: 1-S-2-6-5-3 or 1-S-2-6-4-3
1-5: 1-5-2-6-5
2-8: 2-6-5-7-8
3-4: 3-1-5-2-6-4
5-6: 5-7-8-6
8-7: 8-6-5-7

Note that all unidirectional links on the multicast tree are high cost links and the unidirectional links on the unicast paths are low cost links. Therefore, the backup paths and the multicast tree do not overlap.

Another aspect involves a method of encapsulating undelivered multicast packets into unicast packets and delivering them to a next hop router on a multicast tree upon network failure. This method includes associating a next hop router loopback address with a multicast outgoing interface during multicast routing table creation and detecting a link/interface failure on the multicast tree rapidly. A possible mechanism for carrying out these steps may be the same as link/interface failure detection for a Multi-Protocol Label Switching (MPLS) fast reroute. The method may further include encapsulating undelivered multicast packets into unicast packets with a destination of next hop router loopback address and sending out the unicast packets via unicast forwarding. After receiving the encapsulated multicast packets, the method includes de-capsulatting by the next hop router the encapsulated multicast packets into multicast packets and forwarding them down the multicast tree and tuning network link weights such that the multicast traffic and unicast traffic travel on disjoint paths between two routers.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, multicast or unicast radio broadcasts over IP, on-demand TV over IP, or just-in-time video game rentals over IP. Accordingly, the appended claims and their legal equivalents should only define the invention, rather than any specific examples given.

We claim:

1. A method comprising:
assigning, in an iterative manner, weights to a first series of network links connecting network nodes of a network, the first series of network links forming a ring such that weights have a first high cost in a first direction around the ring and a first low cost in a second direction around the ring;
assigning, in an iterative manner, weights to a second series of network links forming a first chain such that weights have a second high cost in a first direction along the first chain and a second low cost in a second direction along the first chain;
assigning, in an iterative manner, weights to a third series of network links forming a second chain such that weights have a third high cost in a first direction along the second chain and a third low cost in a second direction along the second chain, wherein the ring and the first chain have at least one network node in common, and wherein the second chain and the ring have at least one network node in common; and
upon a network failure in one of the ring, the first chain and the second chain:
delivering multicast packets using a dynamic unicast path restoration procedure wherein the assigned weights in the ring, the first chain and the second chain are associated with interfaces between the network nodes, wherein unicast paths are determined according to the assigned weights, and wherein multicast packets are encapsulated and routed to a next hop router on a multicast tree; and decapsulating received encapsulated unicast packets.

2. The method of claim 1, wherein assigning the weights to the first series of network links is performed such that multicast forwarding paths and unicast forwarding paths are failure disjoint.

3. The method of claim 1, wherein the multicast packets comprise communication data that is part of a two-way communication.

4. The method of claim 1, wherein multicast traffic and unicast traffic do not travel on a same path between nodes.

5. The method of claim 1, further comprising communicating one of a television signal, an audio signal, and a radio signal over an undirected network.

6. The method of claim 1, further comprising, after delivering the multicast packets upon the network failure, tuning the weights such that multicast traffic and unicast traffic travel on disjoint paths.

7. A system comprising:

a processor; and a non-transitory computer-readable storage medium having instructions stored which, when executed by the processor, cause the processor to perform operations comprising:

assigning, in an iterative manner, weights to a first series of network links forming a ring such that weights have a first high cost in a first direction around the ring and a first low cost in a second direction around the ring;

assigning, in an iterative manner, weights to a second series of network links forming a first chain such that weights have a second high cost in a first direction along the first chain and a second low cost in a second direction along the first chain;

assigning, in an iterative manner, weights to a third series of network links forming a second chain such that weights have a third high cost in a first direction along the second chain and a third low cost in a second direction along the second chain, wherein the ring and the first chain have at least one network node in common, and wherein the second chain and the ring have at least one network node in common; and upon a network failure in one of the ring, the first chain and the second chain:

delivering multicast packets using a dynamic unicast path restoration procedure wherein the assigned weights in the ring, the first chain and the second chain are associated with interfaces between the network nodes, wherein unicast paths are determined according to the assigned weights, and wherein multicast packets are encapsulated and routed to a next hop router on a multicast tree; and decapsulating received encapsulated unicast packets using internet protocol unicast encapsulation to a next hop router on a multicast tree.

8. The system of claim 7, wherein assigning the weights to the first series of network links is performed such that multicast forwarding paths and unicast forwarding paths are failure disjoint.

9. The system of claim 7, wherein the multicast packets comprise communication data that is part of a two-way communication.

10. The system of claim 7, wherein multicast traffic and unicast traffic do not travel on a same path between nodes.

11. The system of claim 7, further comprising communicating one of a television signal, an audio signal, and a radio signal over an undirected network.

12. The system of claim 7, further comprising, after delivering the multicast packets upon the network failure, tuning the weights such that multicast traffic and unicast traffic travel on disjoint paths.

13. A non-transitory computer-readable storage device having instructions stored which, when executed by a computing device, cause the computing device to perform operations comprising:

assigning weights to a first series of network links forming a ring such that weights have a first high cost in a first direction around the ring and a first low cost in a second direction around the ring;

assigning weights to a second series of network links forming a first chain such that weights have a second high cost in a first direction along the first chain and a second low cost in a second direction along the first chain;

assigning weights to a third series of network links forming a second chain such that weights have a third high cost in a first direction along the second chain and a third low cost in a second direction along the second chain, wherein the ring and the first chain have at least one network node in common, and wherein the second chain and the ring have at least one network node in common; and upon a network failure in one of the ring, the first chain and the second chain:

delivering multicast packets using a dynamic unicast path restoration procedure wherein the assigned weights in the ring, the first chain and the second chain are associated with interfaces between the network nodes, wherein unicast paths are determined according to the assigned weights, and wherein multicast packets are encapsulated and routed to a next hop router on a multicast tree; and decapsulating received encapsulated unicast packets.

14. The non-transitory computer-readable storage device of claim 13, wherein assigning the weights to the first series of network links is performed such that multicast forwarding paths and unicast forwarding paths are failure disjoint.

\* \* \* \* \*